United States Patent Office 3,068,069
Patented Dec. 11, 1962

3,068,069
PREPARATION OF SILANE
Harold L. Jackson, Wilmington, Del., assignor to E. I. du Pont de Nemours and Company, Wilmington, Del., a corporation of Delaware
No Drawing. Filed Nov. 15, 1957, Ser. No. 696,596
6 Claims. (Cl. 23—204)

This invention relates to a new method for preparing silane.

Silane, $SiH_4$, is a very reactive compound from which almost any silicon compound can be prepared, and it is of particular interest in several specific applications. For example, silane can be pyrolyzed to silicon; it can be added to olefins to form organosilicon compounds, which can be hydrolyzed to silicones; and it can be converted to the reactive silyl halides by reaction with hydrogen halides.

Silane has been prepared by a variety of methods, such as, for example, by the action of hydrochloric acid and magnesium silicide, and by hydrogenation of halosilanes. However, such methods generally possess certain deficiencies such as, for instance, requiring the use of expensive or relatively unavailable starting materials, special purification procedures, and high pressure equipment.

Therefore, an object of this invention is to provide a novel method for preparing silane from low-cost and readily available starting materials. A further object is provision of a more economical preparation of silane suitable for use in large-scale operation. Still another object is provision of a novel method for producing silane not requiring the use of any added reaction medium and not requiring the use of heavy, expensive, high-pressure equipment.

These and other objects are accomplished in accordance with the present invention by a process which comprises contacting an inorganic compound of silicon having Si—O bonds, and being in a form having a high surface area, with hydrogen at a temperature of at least 800° C. in the presence of an electropositive metal having an atomic number between 3 and 30, and having a standard electrode potential of at least 0.44 volt, and rapidly quenching the resulting silane and other reaction gases.

Silicon-containing compounds that are especially suitable for use in the process of this invention include silica, hydrated silicas, and silicates. For best results in the process of this invention, especially when the reaction is carried out at temperatures below the melting or sintering points of the solid reactants, these silicon-containing compounds should be in a finely divided form, i.e., they should have a surface area of at least 0.5 sq. m./g. Specific silicon compounds that can be used include silica gel; silicas of the types commonly used as fillers and reinforcing agents and having colloidal particle size; silicic acids and salts such as sodium metasilicate and sodium orthosilicate; sand; finely divided quartz and silicate minerals of a wide variety of types. Specific silicate minerals that are operable include feldspars, e.g., orthoclase, anorthite, and albite; olivine and related minerals; micas, e.g., muscovite, vermiculite, and phlogopite; zeolites, e.g., analcite, natrolite, and heulandite; talc; diatomite; and clays of various types, e.g., gaolin and bentonite.

Any electropositive metal having an atomic number between 3 and 30 and having a standard electrode potential of at least 0.44 volt can be used in the process of this invention. The standard electrode potentials referred to herein are those given on pages 340–341 of Latimer's "Oxidation Potentials," 2nd ed. (1953), Prentice-Hall, Inc. The electropositive metals defined above include lithium, beryllium, sodium, magnesium, aluminum, calcium, chromium, manganese, iron and zinc, which are all operable. Aluminum is the preferred electropositive metal because of its availability and high reactivity.

The particle size of the electropositive metals used in the process of this invention is not critical. However, it is preferred to use these metals in a form having a high surface area per unit weight in order to obtain more rapid reaction. Metals in the form of powder, granules, turnings, metal coatings on the silicon compound, and the like are particularly preferred.

The reactants used in the process of this invention can be of the ordinary grades of materials available commercially. The hydrogen should be essentially oxygen-free.

As already indicated, the process of this invention can be carried out at temperatures of at least 800° C. Preferably, the reaction is carried out at a temperature between 900° C. and 1450° C.; however, the reaction can be effected, if desired, at temperatures above 1450° C.

The pressure at which the process of this invention is carried out is not critical, pressures ranging from subatmospheric to superatmospheric being satisfactory. Atmospheric pressure is preferred, since operation at atmospheric pressure does not require the use of heavy equipment which is necessary for operation at high pressures.

The contact time of the reactants at reaction temperature is not critical since the reaction takes place between the hydrogen and the electropositive metal and the silicon compound very rapidly at temperatures of 800° to 1450° C. Contact times of between 0.01 and 5.0 seconds can be used. However, it is essential that the silane that is formed in the reaction be removed from the hot reaction zone as rapidly as possible. Silane decomposes slowly at temperatures of about 400° C. and rapidly at temperatures above 800° C. Therefore, to prevent excessive decomposition of the silane, the reaction gases must be cooled immediately; preferably they should be cooled to below 400° C. within 1.0 second after they leave the reaction zone.

The proportions of silicon compound, electropositive metal and hydrogen used in the process of this invention are not critical. However an excess of the electropositive metal and hydrogen ranging up to 100% or more, based on the silicon compound, are preferred. A large excess of hydrogen is particularly preferred since the excess hydrogen sweeps out the reaction zone and removes the silane from the reaction zone rapidly.

The process of this invention can be carried out in various types of equipment. In one embodiment, the process is carried out conveniently by placing a uniform mixture of the silicon compound and the electropositive metal in a shallow refractory container, such as, for example, in a recrystallized alumina boat. This container is then placed in a refractory tube, e.g., a quartz tube, which is heated to a desired reaction temperature by conventional means, e.g., by a cylindrical electric resistance furnace. Hydrogen, which has been purified by passing through drying towers and a trap cooled by liquid nitrogen, is passed through the reaction tube over the surface of the mixture of the silicon compound and the electropositive metal maintained at the desired reaction temperature between 800° and 1450° C.

The effluent gas from the reaction zone is immediately passed through a series of two cold traps, the first cooled by carbon dioxide and the second by liquid nitrogen. The silane produced is collected in the nitrogen-cooled trap.

In another embodiment of the process of this invention, a refractory container is charged with a uniform mixture of the silicon compound and the electropositive metal. The container is fitted with an external heating means, such as, for instance, an electric resistance furnace, and an inlet tube leading to the bottom of the reaction mixture for introduction of hydrogen. The vessel is also fitted with an exit tube leading from the top of the container to cold traps, cooled as described in the previous paragraph. After the container is charged with the reactants and heated to the desired temperature between 800° and 1450° C., a stream of purified hydrogen is passed into the bottom of the reaction mixture through the inlet tube. The reaction gases and excess hydrogen are led immediately to the cold traps where silane is collected in the trap cooled by liquid nitrogen.

In still another embodiment of the process of this invention, particles of the silicon compound, for example, silica, are coated with the electropositive metal. Illustrative of such coating processes are those in which the silicon compound is stirred with the molten metal or the metal is distilled onto the surface of the silicon compound. A method for coating supports with metals is described by Voltz in J. Phys. Chem. 61, 756 (1957). These coated silica particles are supported on a perforated plate in a vertical refractory tube which is heated by an electric resistance furnace. A stream of purified hydrogen is led into the bottom of the reaction tube. The hydrogen passes upward through the reaction zone and the effluent gases and excess hydrogen are led immediately from the top of the tube through cold traps cooled as described previously. The silane formed during the reaction is isolated in the trap cooled by liquid nitrogen.

In all of the above embodiments of the process unreacted hydrogen passes through the liquid nitrogen cooled traps.

The process of this invention is illustrated in further detail by the following examples.

*Example I*

A uniform mixture of 4.3 g. of 80–100 mesh aluminum powder and 6.4 g. of 28–200 mesh silica gel is placed in a boat of recrystallized alumina. The boat and its contents are then placed in a quartz tube which is surrounded by an electric resistance furnace. Hydrogen, which is purified by passing in turn through two drying towers filled with alternating layers of anhydrous calcium sulfate and anhydrous silica gel, a flow meter, and a trap cooled with liquid nitrogen, is passed through the quartz tube. Then it is passed through two cold traps, the first cooled by solid carbon dioxide and the second by liquid nitrogen.

After the system is thoroughly flushed with hydrogen, the temperature of the reaction zone is raised to 1000° C. and hydrogen is passed through at a rate of 1.74 liters under standard conditions of temperature and pressure per minute. The temperature is held at 1000° C. for 55 minutes and then raised to 1200° C. over a period of 55 minutes with the hydrogen flow remaining constant. The condensable reaction product is collected in the trap cooled by liquid nitrogen, and it amounts to approximately 0.5 g.

Mass spectrographic analysis of this reaction product indicates that it consists of 2.0 to 2.5 mole percent of silane, with the remainder being chiefly nitrogen and hydrogen.

*Example II*

Using the procedure of Example I, a mixture of 4.7 g. of 20–80 mesh magnesium powder and 7.0 g. of 28–200 mesh silica gel is placed in the alumina boat. Hydrogen is passed over this material contained in the quartz tube at a rate of 2.1 liters/minute (standard conditions of temperature and pressure) while the tube is being heated to 800° C. The temperature is then raised from 800° to 1000° C. over a period of one hour while the hydrogen flow is maintained at a rate of 2.1 liters/minute, and the off-gas is passed through a liquid nitrogen trap. The temperature is held at 1000° C. for 31 minutes and the hydrogen flow is raised to 2.7 liters/minute during this time. The temperature is then raised from 1000° to 1200° C. over a period of two hours and 30 minutes with the hydrogen flow at 2.6 liters/minute. The condensable reaction products collected in the trap cooled by liquid nitrogen are transferred to a stainless steel cylinder under vacuum. These condensable products weight 0.4 g. and mass spectrographic analysis indicates the presence of 3–4% silane together with nitrogen, hydrogen, and some water vapor.

The essential nature of the electropositive metal in the process of this invention is shown by the fact that no silane is formed when silica wool is heated in a stream of hydrogen at 1200–1210° C. for a period of three hours.

The process of this invention possesses the important advantages over the hitherto known methods for making silane of employing low cost and readily available silicon compounds as the starting materials, not requiring the use of any added reaction medium, and not requiring the use of heavy, expensive, high-pressure equipment.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A method for preparing silane which comprises passing a stream of gaseous hydrogen into contact with finely divided particles of an inorganic compound of silicon selected from the class consisting of silica, hydrated silicas, and silicates, said particles having a surface area of at least 0.5 sq. m. per gram, at a temperature of at least 800° C. in the presence of an electropositive metal having an atomic number between 3 and 30 and a standard electrode potential of at least 0.44 volt while maintaining said reactants in contact for a period from 0.01 to 5.0 seconds, promptly removing the gaseous reactants and reaction products from the reaction zone, quenching them to a temperature below 400° C. within one second after they leave the reaction zone, and recovering silane from the quenched, gaseous mixture.

2. A method according to claim 1 wherein the electropositive metal is aluminum.

3. A method according to claim 1 wherein said electropositive metal is in a form having a high surface area per unit weight.

4. A method according to claim 1 wherein an excess of hydrogen is used.

5. A method for preparing silane which comprises passing a stream of gaseous hydrogen into contact with finely divided particles of an inorganic compound of silicon selected from the class consisting of silica, hydrated silicas, and silicates, said particles having a surface area of at least 0.5 sq. m. per gram, at a temperature of from 900° C. to 1450° C. in the presence of aluminum while maintaining said reactants in contact for a period from 0.01 to 5.0 seconds, promptly removing the gaseous reactants and reaction products from the reaction zone, quenching them to a temperature below 400° C. within one second after they leave the reaction zone, and recovering silane from the quenched, gaseous mixture.

6. A method according to claim 5 wherein said inorganic compound of silicon is silica gel.

References Cited in the file of this patent

UNITED STATES PATENTS

| | | |
|---|---|---|
| 648,463 | Knaur et al. | May 1, 1900 |
| 2,406,605 | Hurd | Aug. 27, 1946 |

OTHER REFERENCES

Hurd: "Chemistry of the Hydrides," 1952, pages 64–65.

Hurd: "Journal of the American Chemical Society," vol. 71, pages 20–22 (1949).

A. Stock: "Hydrides of Boron and Silicon," Cornell University Press, Ithaca, N.Y., page 29. 1933.

W. Eitel: "The Physical Chemistry of the Silicates," The University of Chicago Press, Chicago, Illinois, page 203.